US005838651A

United States Patent [19]

Takahashi

[11] Patent Number: 5,838,651

[45] Date of Patent: Nov. 17, 1998

[54] OPTICAL READ-OUT HEAD CAPABLE OF IMPROVED READ-OUT OF MEDIA WITH DIFFERENT PIT HEIGHTS

[75] Inventor: Jun-ichi Takahashi, Tokyo, Japan

[73] Assignee: NEC Corporation, Tokyo, Japan

[21] Appl. No.: 689,247

[22] Filed: Aug. 7, 1996

[30] Foreign Application Priority Data

Aug. 15, 1995 [JP] Japan .................................... 7-208029

[51] Int. Cl.[6] ........................................ G11B 7/12

[52] U.S. Cl. ........................... 369/109; 369/112; 369/103

[58] Field of Search .................................... 369/109, 110, 369/103, 112, 111, 275.4, 277, 283, 44.11, 44.12, 44.26, 44.37

[56] References Cited

U.S. PATENT DOCUMENTS

| | | | |
|---|---|---|---|
| 4,963,464 | 10/1990 | Setani . | |
| 5,251,198 | 10/1993 | Strickler . | |
| 5,410,529 | 4/1995 | Kurata et al. | 369/109 |
| 5,446,565 | 8/1995 | Komma et al. | 369/103 |
| 5,453,969 | 9/1995 | Psaltis et al. . | |
| 5,475,670 | 12/1995 | Hamada et al. | 369/103 |
| 5,526,336 | 6/1996 | Park et al. . | |
| 5,526,338 | 6/1996 | Hasman et al. . | |

FOREIGN PATENT DOCUMENTS

| | | |
|---|---|---|
| 0 521 619 | 1/1993 | European Pat. Off. . |
| 0 594 193 | 4/1994 | European Pat. Off. . |
| 61-12974 | 1/1986 | Japan . |
| 64-49141 | 2/1989 | Japan . |
| 4-92212 | 3/1992 | Japan . |
| 2 122 408 | 1/1984 | United Kingdom . |

OTHER PUBLICATIONS

Marx, David S. et al., "Pit Depth Encoded Memories", pp. 41 and 42.

*Primary Examiner*—Muhammad N. Edun
*Attorney, Agent, or Firm*—Young & Thompson

[57] ABSTRACT

In an optical read-out head used for a multi-value information recording medium, fluctuations in a reproduction signal-to-noise ratio can be greatly reduced to reproduce reflected light with consistent performance. In an optical read-out head, after light emitted from a light source has been focussed by an objective lens, the focussed light is reflected by a multi-value information optical recording medium having a plurality of pit heights, and the reflected light passes through the objective lens, and thereafter, the reflection light is detected by a photodetector. An optical light separating element for separating the incident reflected light into diffracted sub-beams each conveying the information of a different pit height is provided in an optical path of the reflected light defined from the objective lens to the photodetector. A light receiving structure including the photodetector is provided which separately receives the diffracted beams separated by the optical light separating element.

4 Claims, 5 Drawing Sheets

10 4 2 1 3 5 c b 7 a 8 6

10
4
3
2
1
6

OPTICAL READ-OUT HEAD CAPABLE OF IMPROVED READ-OUT OF MEDIA WITH DIFFERENT PIT HEIGHTS

BACKGROUND OF THE INVENTION

1. Field of the Invention

The present invention generally relates to an optical read-out head. More specifically, the present invention is directed to an optical read-out head for optically reproducing information from an optical recording medium such as an optical disk.

2. Description of the Related Art

FIG. 1 shows schematically a conventional optical read-out head. In this drawing, the conventional optical read-out head is made up of a semiconductor laser 1, a diffraction grating 2, a beam splitter 3, an objective lens 4, and a photodetector 6. In this conventional optical read-out head, a very small (fine) spot is formed on an optical disk 10 by using a light beam, and the reflected light is used to generate the information reproduction signal.

The operation of this conventional optical head apparatus will now be described. That is, the laser light emitted from the semiconductor laser 1 passes through the diffraction grating 2, so that this laser beam is converted into three laser beams used to detect a tracking error signal. Thereafter, these three beams are reflected by the beam splitter 3, and then the reflected beams are focussed on the information surface of the optical disk 10 by the objective lens 4 and are reflected thereby.

The light reflected from the optical disk 10 passes through the objective lens 4 and the beam splitter 3, and thereafter is incident on the photodetector 6 so as to be converted into the electric signal. In such a focusing servo control, the light spot follows the vertical deviations of the optical disk 10 with the light spot focused on the information surface of the optical disk 10 whereafter the light reflected from the optical disk 10 again passes through the objective lens 4 and the beam splitter 3. In this beam splitter 3, the incident light will cause astigmatism, and thereafter this light reaches the photodetector 6, so that the focusing error signal is detected.

Also, in such a tracking servo control, the spot follows radial deviation of the optical disk 10 with the light spot tracing-scanned over the tracks formed on the optical disk 10, whereafter the above-described three beams formed by the diffraction grating 2 are illuminated on the optical disk 10. The rotation position of the diffraction grating 2 is set in such a manner that the two beams (+ and − first order diffraction light) are located on both sides of a tracking pit, and these two beams are shifted front/rear along the scanning direction with respect to the center beam, and also shifted radially of the disc with respect to this center beam. In the photodetector 6, a difference between the photoconverted signals from the reflection light of the + and − first order diffraction light is calculated so as to detect the tracking error signal.

In the optical information reproducing apparatus having the above-explained conventional optical read-out head, a strong demand has arisen to increase the storage capacity of the optical disk 10. To achieve this purpose, the easiest method is to narrow the diameter of the light spot irradiated on the optical disk 10.

Since the diameter of the light spot irradiated on the optical disk 10 is directly proportional to the wavelength "λ" of the irradiated laser light, and also inversely proportional to the numerical aperture NA of the objective lens 4, various designs are carried out in such a manner that the wavelength "λ" is shortened, or the numerical aperture NA is increased. However, there is a substantially cost penalty in designing the semiconductor laser 1 and the objective lens 4 when the wavelength "λ" is shortened, or the numerical number "NA" of the objective lens 4 is increased.

Accordingly, another conventional method for realizing high density optical disks, is to produce a multi-layer disc, with plural recording pitch (for instance, Japanese Laid-open Patent Application No. 61-12974). Among these conventional methods, it has been proposed to record various different marks of unit information shape, or a format in which the recording direction on the recording medium is available also along the vertical direction (see for example Japanese Laid-open Patent Application No. 61-12974, No. 64-49141, No. 4-92212).

For instance, according to Japanese Laid-open Patent Application No.4-92212, detection is made of the diffraction direction of the diffraction pattern of the diffracted light produced by irradiating the read-out light beam on the optical disk, so that the multi-value information is reproduced.

On the other hand, when the information is read from the optical disk in the above-described conventional optical read-out head, there are differences in the signal amplitudes because of the differences in either the mark unit information shape or the mark unit information format. This may cause fluctuations and unevenness in the reproduction signal-to-noise ratio. Thus, it is very difficult to reproduce the multi-value information with consistent performance.

FIG. 2 represents a change in signal amplitudes by way of a multi-value structure. In FIG. 2, the abscissa shows a pit height, and symbol "λ" denotes a wavelength. The ordinate indicates an error detection sensitivity of a typical push-pull method among a tracking error detection, and a modulation amplitude of a recording signal. Also, a curve "I" indicated by a solid line represents a relationship between the error detection sensitivity of the push-pull method and the pit height, whereas another curve "III" shown by a dotted line indicates a relationship between the modulation amplitude of the recording signal and the pit height.

As apparent from the curve "I" shown in FIG. 2, the pit height at which the maximum error detection sensitivity by the push-pull method could be achieved is equal to λ/8. If light having a wavelength λ=780 nm is utilized, a maximum tracking error signal could be obtained when the pit height becomes 975 Angstrom. On the other hand, as is apparent from curve II of FIG. 2, since the pit height is approximately λ/5, maximum modulation amplitude of the recording signal occurs for light of wavelength λ=780 nm at a pit height substantially equal to 1500 Angstrom.

From the foregoing descriptions, it will be understood that there is a difference between the optimum pit heights in the error detection sensitivity of the push-pull method and the modulated amplitude of the recording signal. Also, as to the multi-value information recording medium in which the pit height is varied, even when the pit height is several hundred Angstroms, variations appear in the respective signal amplitudes and the signal levels are detected based on the variation of signal amplitudes.

As a consequence, in the conventional optical read-out head for reproducing the multi-value information recording medium, no detection could be made of the multi-value information without producing the differences in the reproduction signal amplitude by the multi-value structure. Therefore, excessive noise causes false detector and the feature of the large capacity by the multi-value recording information is not sufficiently realized.

SUMMARY OF THE INVENTION

The present invention has been made to solve the above-described problems, and therefore, has an object to provide an optical read-out head capable of detecting the amplitude of a reproduction signal at a constant value from an optical recording medium having recorded thereon multi-value information in order to realize high recording density of the optical recording medium.

To achieve this object, an optical read-out head according to the present invention is characterized in that, after light emitted from a light source has been collected by way of an objective lens, the collected light is reflected on a multi-value information optical recording medium having a plurality of pit heights, and said reflected light passes through said objective lens, and thereafter, said reflection light is detected by a photodetector. According to the invention, optical light separating means for separating the incident reflected light into diffracted sub-beams each conveying the information of a different pit height is provided in an optical path of said reflected light defined from said objective lens to said photodetector. Light receiving means including said photodetector is provided which separately receives the diffracted beams separated by said optical light separating means.

The optical light separating means, according to the present invention, is preferably a hologram optical element having an interference fringe pattern, through which said reflected light is passed. Furthermore, the interference fringe pattern is preferably recorded by light emitted from a first light source located at a position corresponding to a reference pit height position of said multi-value information optical recording medium, and light emitted from one or more light sources located at a position different from said reference pit height position.

In accordance with the present invention, since the diffracted beams which have been optically separated by the optical separating means independently received, the reflected light can be separately detected by the light receiving means, thus reading the different pit heights independently of relative signal amplitudes.

BRIEF DESCRIPTION OF THE DRAWINGS

The present invention will be better understood from the following detailed description, when read in conjunction with the accompanying drawings in which.

DETAILED DESCRIPTION OF THE PREFERRED EMBODIMENTS

Figure 1:
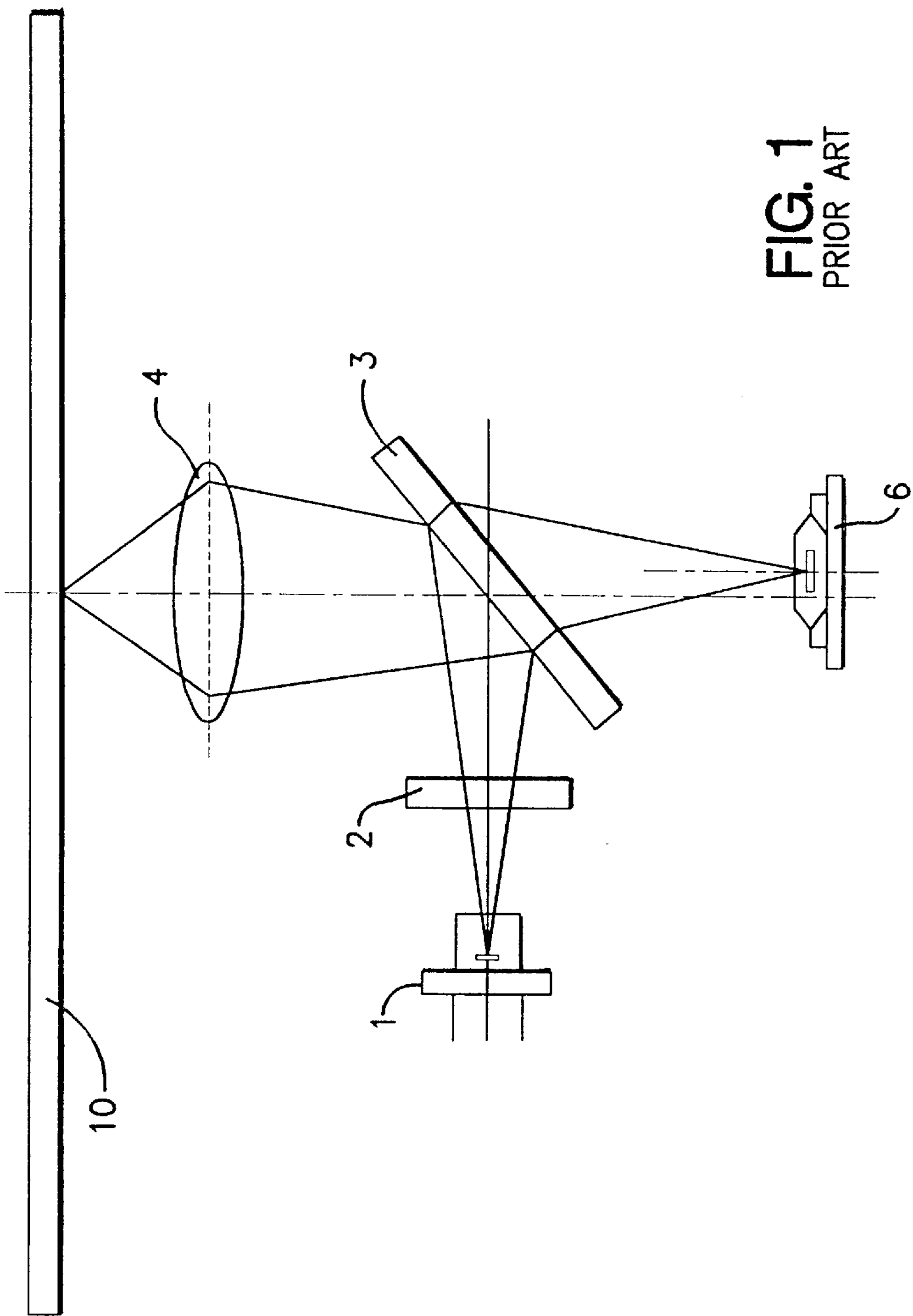
FIG. 1 schematically indicates the arrangement of the conventional optical read-out head.
Figure 2:
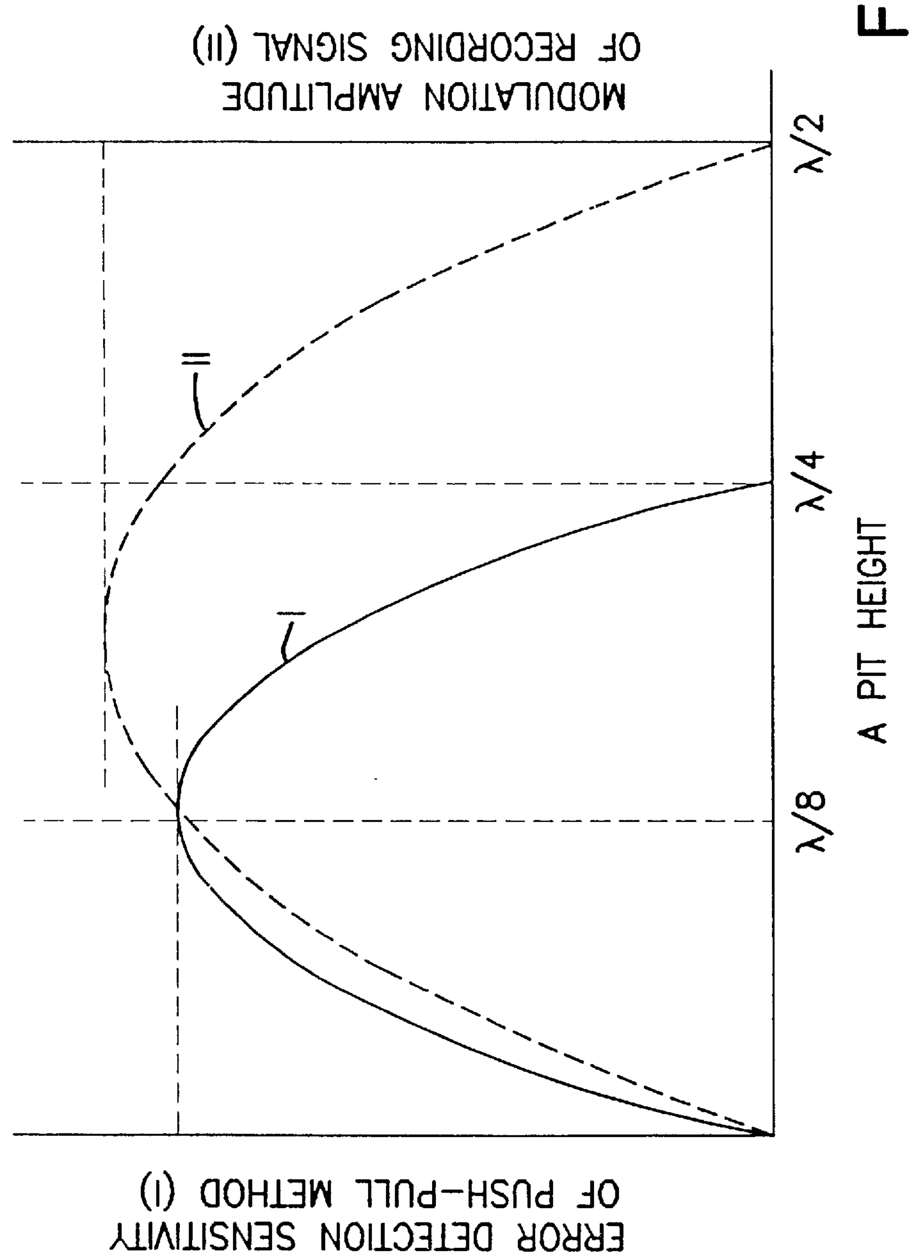
FIG. 2 shows variations in the signal amplitudes caused by the conventional multi-value structure of the optical disk.
Figure 3:
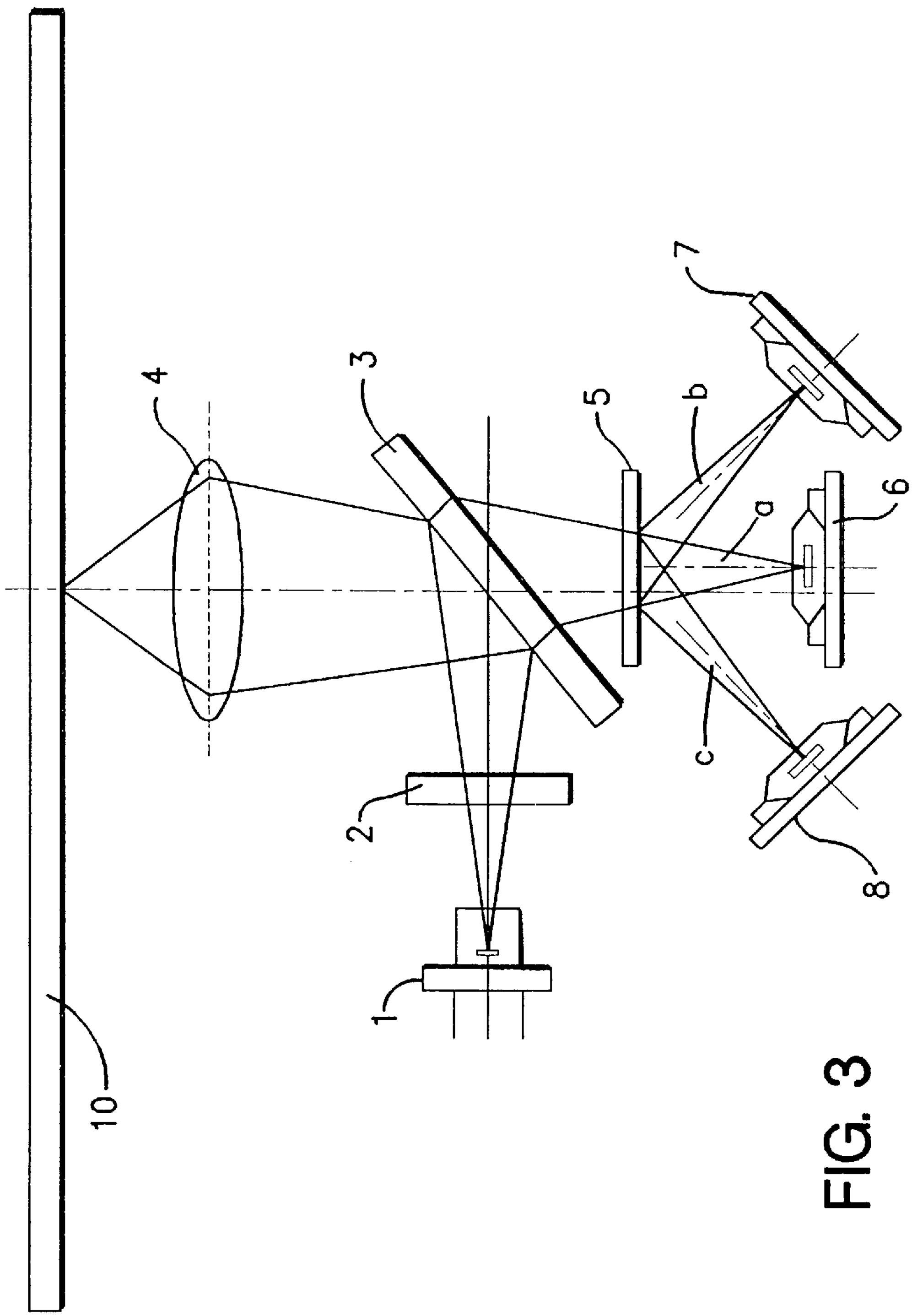
FIG. 3 schematically illustrates an arrangement of an optical read-out head according to a preferred embodiment of the present invention.

Referring now to the drawings, an optical read-out head according to an embodiment of the present invention will be described. FIG. 3 is a structural diagram of an optical read-out head according to one embodiment of the present invention. It should be noted that the same reference numerals shown in FIG. 1 will be used to represent the same or similar elements of FIG. 3. As indicated in FIG. 3, this optical read-out head is constructed of a semiconductor laser 1, a diffraction grating 2, a beam splitter 3, an objective lens 4, a hologram optical element 5, and photodetectors 6, 7, 8.

In operation, laser light emitted from the semiconductor laser 1 passes through the diffraction grating 2 to produce tracking spots. The optical path along which this laser light travels is converted by the beam splitter 3 (namely, 45-degree reflection mirror) by 90 degrees, and then the path-converted later light is received by the objective lens 4. Thus, the laser light sent to the objective lens 4 is focussed to become a very fine (small) spot which will then be irradiated on to the optical disk 10.

The laser light irradiated onto the optical disk 10 is reflected by the topographical features (pits) of the optical disk 10, and then the reflected laser light again passes through the objective lens 4. This incident laser light travels along an optical path in a direction opposite to that when the laser light sent to the optical disk. Thus, the laser light which has passed through the objective lens 4 will pass through the beam splitter 3 and then may produce astigmatism. This laser light passes through the hologram optical element 5 for reproducing the multi-value information via the photodetector 6, so that this incident laser light is photoconverted to thereby produce the focus error signal caused by the astigmatism.

In this case, the hologram optical element 5 provided in the optical system between the beam splitter 3 and the photodetector 6 is arranged in such a manner that a difference in the reproduced pit height corresponds to different diffracted beams emerging from element. The interference fringe corresponding to the pit having the reference height is recorded as zero order diffraction light, whereas the interference fringe corresponding to such a pit having a different height from the above-described reference height is recorded as first order diffraction light.

Figure 4A:
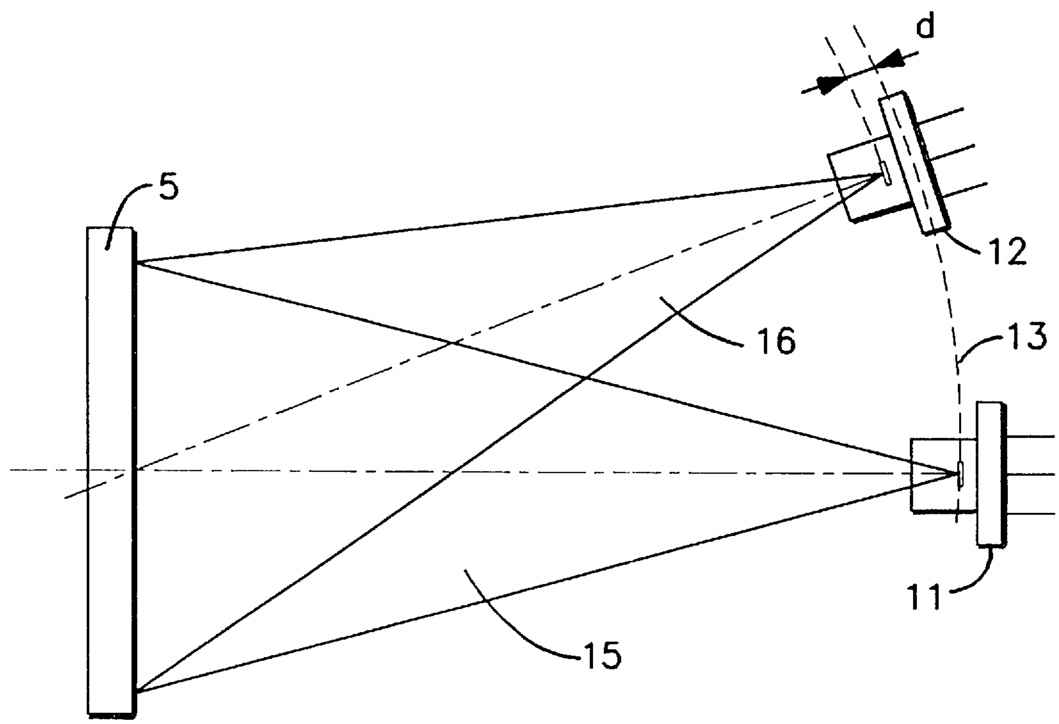
FIGS. 4A and 4B schematically represents one structural example when the hologram optical element of FIG. 3 is manufactured, and also another example of the pattern.

That is, as indicated in FIG. 4(*a*), element 5 is produced using reference light 15 emitted from a light source 11 arranged at a reference pit height 13, and light 16 emitted from another light source 12 arranged at a position of a pit whose height differs from the reference height by a distance "d", thereby to cause recording light interference with the reference light 15. In use, when the reflected light reaches this hologram optical element 5 formed in this manner, this light is separated into the zero order diffraction light and the first order diffraction light due to the difference in the pit heights corresponding to the reflection position of this reference light.

As a consequence, the light reflected from the optical disk 10, which has passed through the beam splitter 3 of FIG. 3, reaches the hologram optical element 5, and then this light is separated into the zero order diffraction light, and "+" first order diffraction light and "−" first order diffraction light, because of the difference in the pit heights recorded on the optical disk 10. That is, the zero diffraction light "a" reaches the photodetector 6, the "+" first order diffraction light "b" reaches the photodetector 7, and the "−" diffraction light "c" reaches the photodetector 8.

In this embodiment, the photodetectors 7 and 8 are separately provided in order to detect the "+" first order diffraction light and "−" first order diffraction light. Alternatively, to make the optical read-out head more compact, a plurality of photodetector regions may be employed within one photodetector by practically setting the diffraction angle of the hologram optical element 5.

Figure 5A:
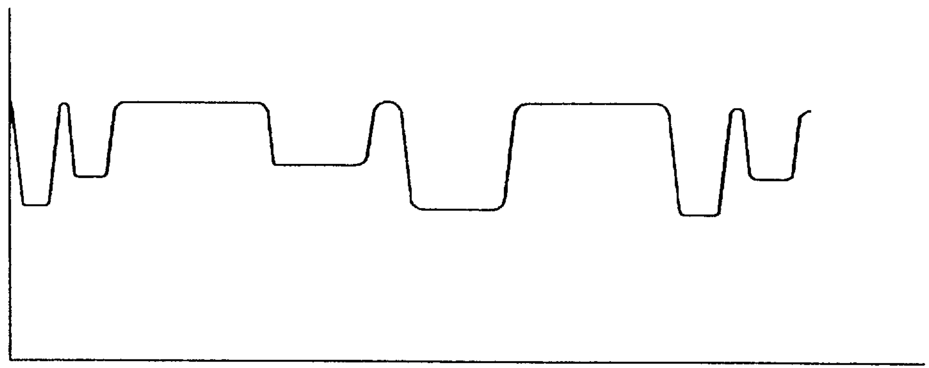
FIGS. 5A–5C are a sectional view for showing a multi-value structure of an optical disk, and is a diagram for indicating a waveform of a reproduction signal of the optical head apparatus shown in FIG. 3.
Figure 5B:
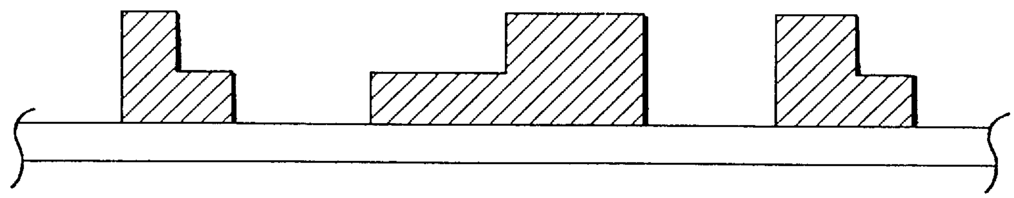

When a multi-value information recording disk is reproduced, if, for example, two pit heights are selected (as indicated in a sectional view of the optical disk of FIG. 5B), both the zero order diffraction light and "+" first order diffraction light separated by the hologram optical element 5 are detected by the photodetectors 6 and 7. A waveform of the resultant reproduction signal is represented as in FIG. 5A.

Figure 5C:
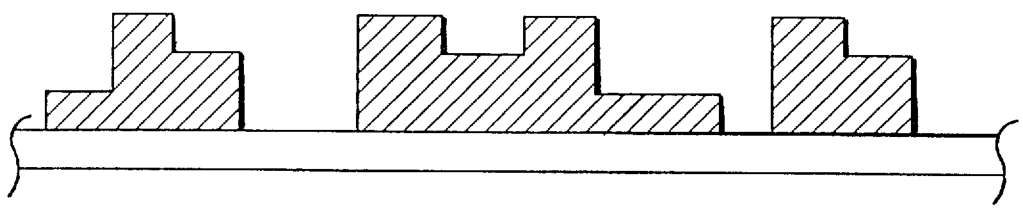

Also, in order to achieve higher density of the optical disk 10, when three, or more pit heights are selected, while the height difference along the pit height direction is shown in sectional view of the optical disk of FIG. 5*c*, the zero order diffraction light, the "+" first order diffraction light, the "−" first order diffraction light, and furthermore "+" second order diffraction light as well as "−" second order diffraction light may be conducted so as to detect reproduction signals.

As previously explained, in accordance with the embodiment of the present invention, when the reproduction signal from the multi-value information recorded optical disk 10 is read out, since the reflection light is detected by the respective photodetectors in response to the differences along the pit height direction, the fluctuations and unevenness in the reproduction signal-to-noise ratio caused by the differences along the pit height direction can be considerably reduced. As a consequence, the multi-value information can be reproduced with consistent performance.

Figure 4B:
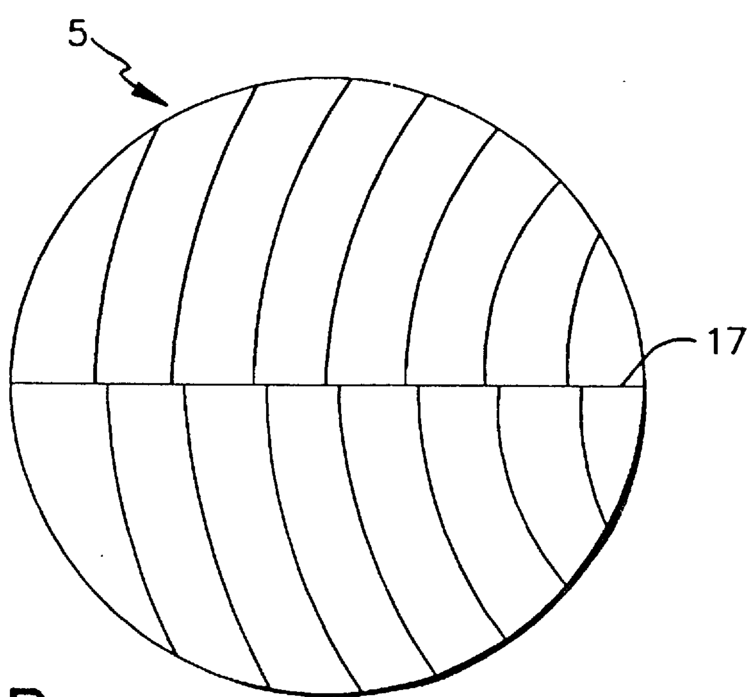

It should be noted that the hologram optical element 5 may be constructed of a split structure as indicated in FIG. 4*b*. In this case, as shown in the plan view of FIG. 4*b*, coaxial interference fringe patterns are formed in the upper and lower regions, and sandwich a split line 17 along the horizontal center direction. When such a hologram optical element is formed in which the coaxial interference fringe patterns have been formed in each of such split regions, a third light source is provided at a position symmetrically located from the light source 12 with respect to the optical source 13 as the center, and the light emitted from the respective light sources is used to interfere with the reference light in FIG. 4*a*.

In the case that such a hologram optical element is employed, it is possible to detect the focusing error by way of the typical knife edge method as the focusing error detecting method, which utilizes the difference in the focal distances of the objective lens caused by the focusing error. Accordingly, since a total number of components such as the knife edge and the lens can be reduced, the optical read-out head can be realized in low cost.

As has been described in detail, the reflected light is separated by controlled diffraction into light having different orders by the optical light separating means, depending upon the differences of the pit height. Since the respective photodetectors can independently detect the reflected light in response to the differences of pit height, the fluctuations and unevenness in the reproduction signal-to-noise ratio caused by the difference in the pit height direction can be greatly lowered, as compared with that of the conventional optical head apparatus. The multi-value information can thus be reproduced with consistent performance.

Also, in accordance with the present invention, more than two different pit heights may be reproduced by properly designing the hologram optical element. Therefore, the storage capacity of the multi-value information optical recording medium can be significantly increased.

What is claimed is:

1. An optical read-out head comprising a light source, an objective lens for focussing light on an optical recording medium having a plurality of different pit heights, and at least one photodetector for detecting light reflected from said medium, further comprising:

light separating means for separating reflected light into diffracted sub-beams each conveying information content of a different pit height of said optical recording medium, and provided in an optical path of said reflected light defined from said objective lens to said photodetector; and light receiving means including said at least one photodetector, for separately receiving said diffracted sub-beams.

2. The optical read-out head as claimed in claim 1 wherein:

a plurality of photodetector regions are employed within one photodetector.

3. The optical read-out head as claimed in claim 1 wherein:

said optical light separating means is a hologram optical element having an interference fringe pattern.

4. An optical head apparatus as claimed in claim 3 wherein:

said hologram optical element is produced using reference light from a first light source located at a position corresponding to a reference pit height position of said multi-value information optical recording medium, and interfering with light emitted from at least one light source located at a position different from said reference pit height position.

* * * * *